53-331.5
9/2/86 XR RE 32,237

SR

United States Patent [19]

Willingham

[11] E Patent Number: Re. 32,237

[45] Reissued Date of Patent: Sep. 2, 1986

[54] CLOSURE PRE-TIGHTENER FOR CLOSURE APPLICATING MACHINES

[75] Inventor: Wendell D. Willingham, Sturgis, Mich.

[73] Assignee: Owens-Illinois, Inc., Toledo, Ohio

[21] Appl. No.: 716,065

[22] Filed: Mar. 26, 1985

Related U.S. Patent Documents

Reissue of:

[64] Patent No.: 4,308,707
Issued: Jan. 5, 1982
Appl. No.: 99,763
Filed: Dec. 3, 1979

[51] Int. Cl.[4] ..... B67B 3/20; B67B 3/062; B65B 7/28

[52] U.S. Cl. ..... 53/314; 53/317; 53/331.5

[58] Field of Search ..... 53/313, 331.5, 314, 53/315, 316, 317

[56] References Cited

U.S. PATENT DOCUMENTS

| | | | |
|---|---|---|---|
| 3,071,909 | 1/1963 | Elleman | 53/315 |
| 3,477,202 | 11/1969 | Zetterberg | 53/315 |
| 3,771,284 | 11/1973 | Boeckmann et al. | 53/314 X |
| 3,874,147 | 4/1975 | Zetterberg | 53/314 |
| 3,908,341 | 9/1975 | Conti | 53/314 |
| 3,924,384 | 12/1975 | Kinney | 53/314 X |
| 3,945,174 | 3/1976 | Franz | 53/317 X |

*Primary Examiner*—Horace M. Culver
*Attorney, Agent, or Firm*—John R. Nelson

[57] ABSTRACT

This invention provides a pre-tightening mechanism for effecting the initial application of a threaded closure on a threaded bottle neck. The pre-tightening mechanism includes a friction rail for effecting a turning movement of the closure relative to the bottle neck and a spring biased cap hold-down plate which maintains a substantially constant pressure on the closure and maintains the closure panel horizontal during the pre-tightening operation.

1 Claim, 4 Drawing Figures

CLOSURE PRE-TIGHTENER FOR CLOSURE APPLICATING MACHINES

Matter enclosed in heavy brackets [ ] appears in the original patent but forms no part of this reissue specification; matter printed in italics indicates the additions made by reissue.

BACKGROUND OF THE INVENTION

Innovation in the carbonated beverage bottling industry is very much dependent on the ready availability of machinery for processing new types of container and/or closures. For years, the crown was the dominant closure employed and only in the last fifteen years was there any significant swing to a different type of closure, which comprised a cap shell of aluminum which was inserted over the threaded neck end of the container and then secured in place by rolling threads in situ into the walls of the cap shell. Such closures are commonly called roll-on caps. This type of closure application necessarily required a completely new applicating machine because not only was an axial force necessary to hold the closure in place on the bottle neck and effect a seal between the closure liner and the end of the bottle neck, but concurrently, a rotating movement had to be imparted to the thread forming rollers. There was no practical way that a conventional crown-type applicating machine could be modified to apply the new style roll-on closures and, as a result, the adoption of the new closure proceeded very slowly.

However, it did proceed and practically every carbonated beverage bottler now has a machine installed in his bottling line that is capable of applying an aluminum shell on the neck of a bottle and rolling threads into the shell to effect the threaded securement of the roll-on closure to the bottle.

In recent years, there have been significant developments in plastic technology making the utilization of a threaded plastic closure completely feasible for use in the carbonated beverage field. For example, a threaded closure of the type shown in U.S. Pat. Nos. 3,987,921 and 4,016,996 has been shown to be commercially practicable, and would be an economically desirable change for the average bottler to adopt, if he did not have to invest in new applicating machinery to assemble this style closure to the bottle neck.

Since this particular closure requires a concurrent application of an axial force to the top panel of the closure with a rotation of the closure relative to the bottle neck, it would obviously be desirable to attempt to utilize the existing closure applicating machines for effecting the assemblage of aluminum shells to bottle necks to apply this new style plastic closure, and thus greatly minimize the capital investment required for the average bottler to adopt the new plastic closure.

In my co-pending application Ser. No. 94,514 filed Nov. 15, 1979, I have disclosed and claimed a number of different modifications of capping heads which may be applied to existing roll-on closure applicating machines for effecting the assemblage of plastic screw-thread type closures to threaded bottle necks. I have found that some of the existing roll-on type applicating machines do not incorporate a sufficient rotational movement of the capping head as it approaches its lowermost position relative to the bottle to effect the complete threading of a closure onto the threaded bottle neck. Hence, for these particular applicating machines, there is a need for a pretightening mechanism which will partially apply a threaded closure on the threaded neck of a bottle prior to the closure being engaged by the applicating head of the type described in my aforementioned co-pending application. Pre-tightening on the order of one half to a full turn of the closure threads relative to the bottle threads may be required and, during such initial threading action, it is very desirable that a constant downward force be maintained on the panel portion of the closure and, at the same time, the panel portion of the closure be maintained in a horizontal plane. In this manner, cocking or cross threading of the closure on the bottle threads will be avoided.

SUMMARY OF THE INVENTION

This invention provides a pre-tightening apparatus for existing capping machines of the type described in my aforementioned co-pending application for effecting the assemblage of an internally threaded plastic closure onto a threaded bottle neck. The pre-tightening mechanism embodies a frictional rail which is disposed along the path of movement of a closure loosely positioned on the neck of a bottle as the bottle and closure are moved into an applicating machine. The frictional rail engages the side wall of the closure and effects a relative turning of the closure with respect to the bottle so as to initiate the threading of the closure onto the threads on the bottle neck. Concurrently, the top panel of the closure is engaged by a hold-down plate which, through a unique spring-biased linkage, is floatingly supported to engage the top panel of the closure and maintain it a horizontal plane and, at the same time, maintains a substantially constant axially downward force on the closure to assist in initiating the preliminary threading operation.

Further objects and advantages of this invention will be apparent to those skilled in the art from the following detailed description, taken in conjunction with the annexed sheets of drawings.

DESCRIPTION OF THE PREFERRED EMBODIMENT

Figure 1:
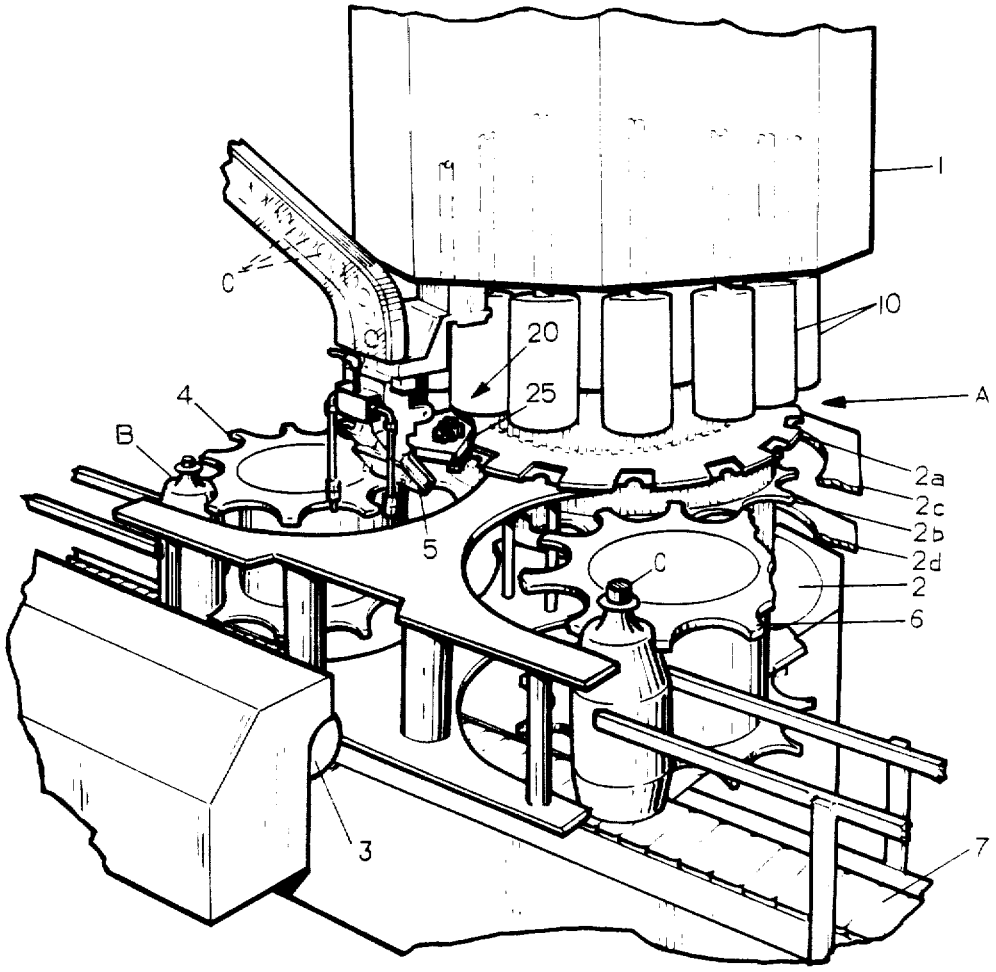
FIG. 1 is a schematic prespective view of a cap applicating machine incorporating a pre-tightening mechanism constructed in accordance with this invention.

The pre-tightening mechanism 20 incorporating this invention is positioned intermediate the cap feeding mechanism 5 and the rotary table 2 of a cap applicating machine A.

The capping machine A is of the type heretofore manufactured and sold by Aluminum Company of America for the application of roll-on closures to the threaded necks of beverage bottles. A machine of this type is described and illustrated in detail in U.S. Pat. No. 3,760,561 to David J. Over et al, hence the mechanism of the entire capping machine A will not be further described. The machine does involve a rotating turret 1 moving with rotating bottle table 2. Star wheels 2a and 2b located above table 2 also rotates with table 2 and provide lateral support to the side wall and neck portions of the bottles as they are moved in a circular path by the rotary bottle table 2. Guide rails 2c and 2d hold the bottles in the star wheel pockets.

The bottles B, filled with carbonated beverage or any other liquid product, are supplied to the rotary table 2 by a conventional worm infeed 3 and a star wheel transfer 4. Immediately before entering the rotary table 2, an internally threaded plastic cap C is loosely deposited on the neck of each bottle by a conventional cap feeding mechanism 5. The caps C are successively engaged by rotating applicating heads 10 carried by turret 1 and applied to the threaded neck of the bottles B as the bottles are moved around the pheriphery of the rotary table 2. The capped bottles are removed from the rotary bottle table 2 by a conventional star wheel 6 and deposited on a moving conveyor 7 which conveys them to a case packer (not shown).

Figure 2:
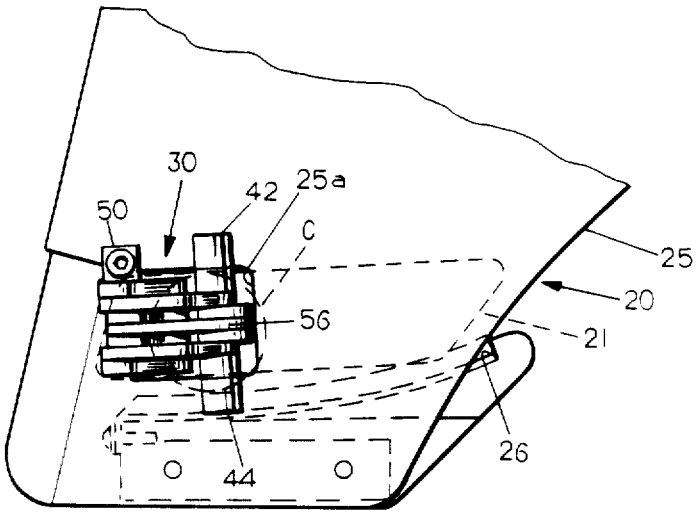
FIG. 2 is an enlarged scale, top elevational view of the pre-tightening mechanism incorporated in the machine of FIG. 1.
Figure 3:
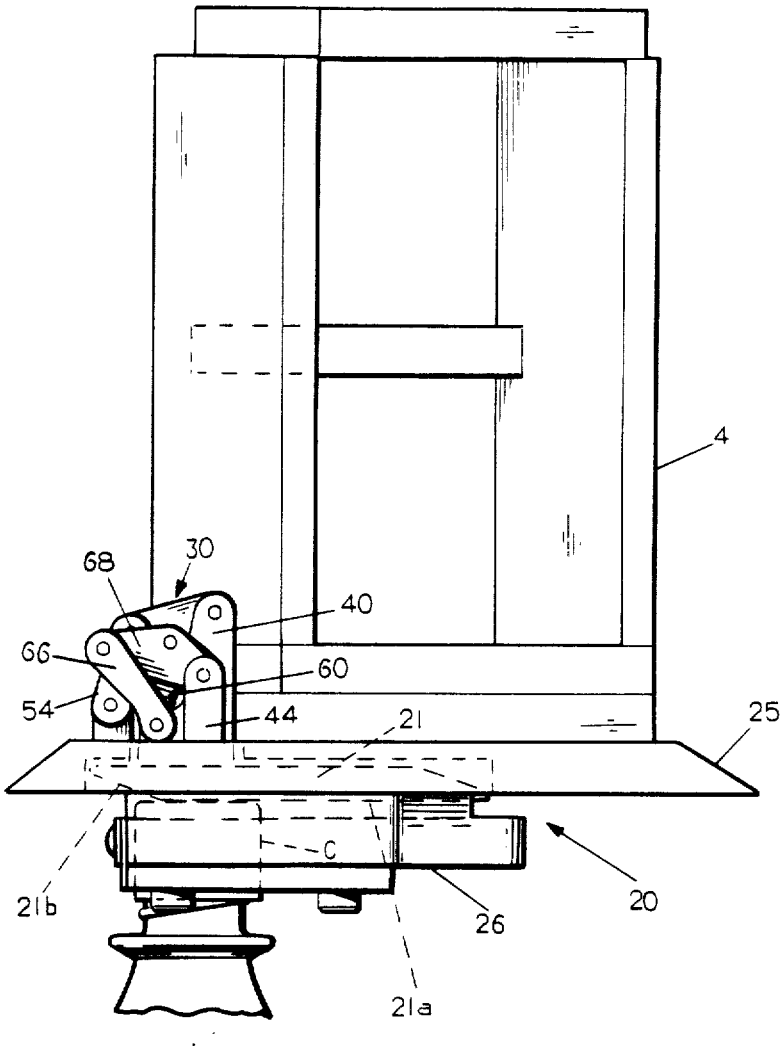
FIG. 3 is a side elevational view of FIG. 2.

Ass best shown in FIG. 2, a cap C is loosely positioned on the top of the bottle by the cap feeding mechanism 5 and bottle B is then moved by infeed star wheel 4 under a pre-tightening mechanism 20 embodying this invention. Each cap has its top panel surface yieldingly engaged by a cap positioning plate 21 which is mounted for spring opposed vertical movements relative to an overhead support plate 25 suitably mounted on the frame of the cap applicating machine 1. The support plate 25 also supports in depending relationship, an arcuate friction rail 26 which is disposed adjacent the path of each cap C as it is moved by the infeed star wheel 4 and exerts a frictional engagement on the sidewall of the cap to produce a relative turning of the cap C with respect to the bottle B so as to initiate the threading of the cap onto the threads of the bottle neck.

Figure 4:
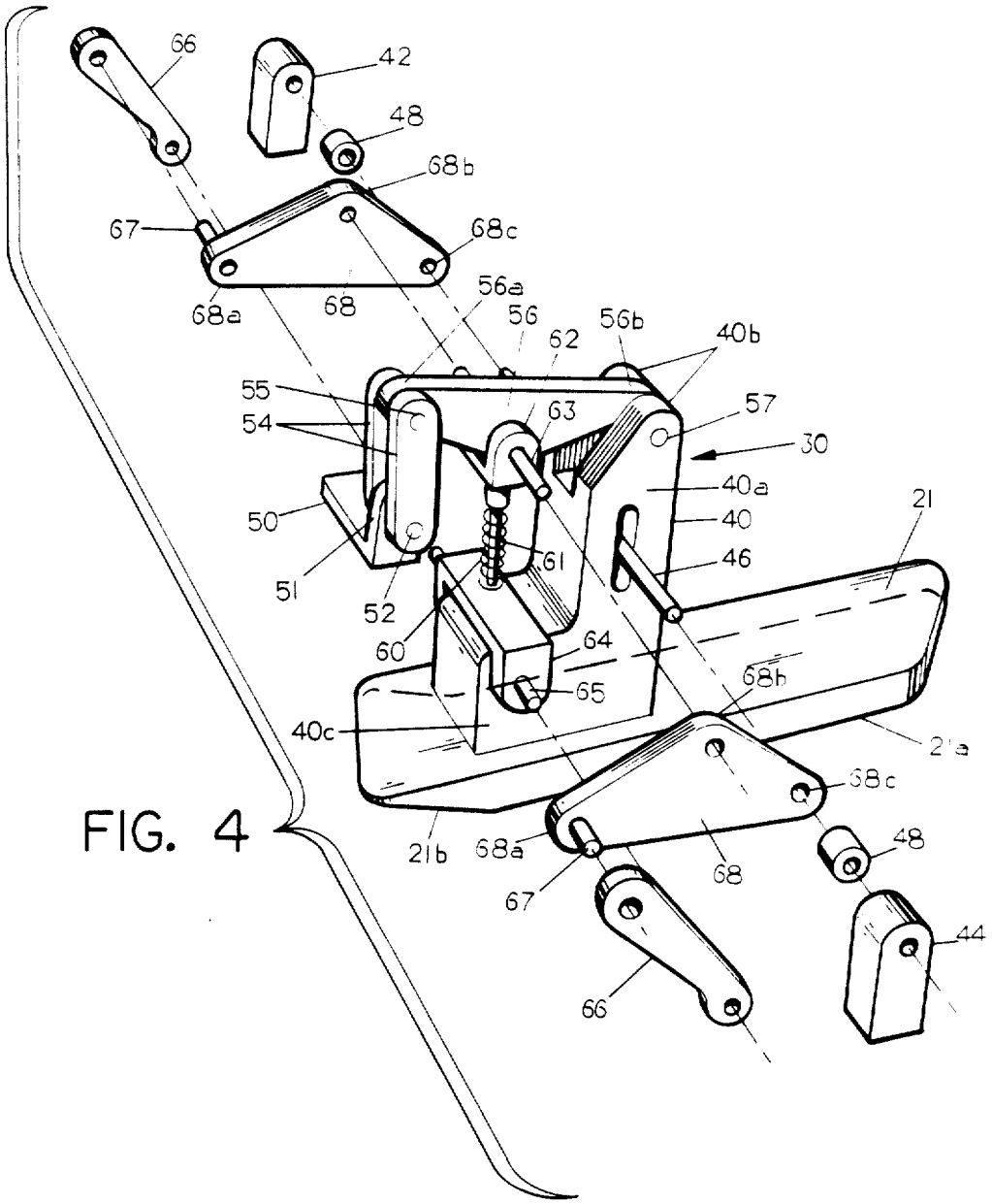
FIG. 4 is an exploded perspective view of the linkage by which the cap engaging plate is supported for rectilinear vertical movements when engaged by a loosely positioned cap carried on a bottle passing beneath the pre-tightening mechanism.

Since the cap is otherwise unrestrained, it is very important that the panel portion of the cap be maintained in an exactly horizontal position during the pretightening rotation of the cap and, also, that a modest downward force be applied to the cap to assist in engaging the cap threads with the bottle threads. The linkage mechanism 30, best shown in FIG. 4, controls the vertical movement of the cap engaging plate 21 so as to insure that such plate moves only vertically to follow the cap and that its bottom surface 21a is always exactly horizontal. Furthermore, the linkage 30 provides a modest downward spring bias on the cap engaging plate 21 to maintain it firmly in engagement with the top of the threaded bottleneck, and thus eliminate the possibility of the cap cocking to any degree that would result in a cross-threading of the cap on the bottleneck. The leading edge 21b of bottom surface 21a is tapered to facilitate initial engagement with cap C.

The linkage mechanism 30 (FIG. 4) comprises an upstanding L-shaped mounting element 40 rigidly secured to cap hold-down plate 21 as by a plurality of screws (not shown). The L-shaped mounting element 40 projects upwardly through a generally rectangular slot 25a provided in the mounting plate 25. Two laterally spaced posts 42 and 44 are respectively rigidly secured to the top surface of the mounting plate 25 on opposite sides of the upstanding L-shaped mounting element 40. A second bracket 50 is bolted to the top surface of the mounting plate 25 and has an upstanding pivot mounting arm 51 which is traversed by a pivot pin 52. A pair of identical links 54 straddle the upstanding arm 51 and are respectively secured to the pivot pin 52.

The other ends of the links 54 support a pivot pin 55 and one vertex 56a of a generally triangularly shaped connecting link 56 is pivotally connected to such pin. The other vertex 56b of the triangular link is pivotally connected to a pin 57 which traverses the bifurcated top portions 40b of the upstanding arm 40a of the L-shaped mounting element.

A downward spring force on the plate 21 is produced by a compression spring 60 surrounding a rod 61. Spring 60 has its top end abutting a yoke shaped spring anchor 62 which is slidable on rod 61 and pivotally mounted to the third vertex of the triangular link 56 by a pin 63. The lower end of the spring 60 abuts a yoke shaped spring anchor 64 which is pivotally mounted to the lateral arm 40c of the L-shaped mounting element 40 by a pin 65. The last mentioned pin has laterally projecting end portions which respectively mount the bottom ends of a pair of connecting links 66. The top end of each connecting link 66 is respectively pivotally connected to a stub pin 67 projecting laterally from one vertex 68a of a triangular connecting link 68. The center vertices 68b of the connecting links 68 are respectively pivotally mounted on lateral extensions of the upper spring anchor pin 63. The third vertices 68c of the pair of triangular connecting links 68 are respectively mounted on the lateral extremities of a horizontally disposed pin 46 mounted in the posts 42 and 44 and traversing a vertical slot 40d in the medial portions of the upstanding arm 40a of the L-shaped mounting element 40 and extending through spacer sleeves 48 and appropriate mounting holes in the stationary posts 42 and 44.

The described linkage has the property of permitting only an exactly linear vertical movement of the hold-down plate 21 when it is engaged by a bottle cap C passing there beneath. As mentioned, the entering end of bottom surface 21a of the hold-down plate 21 is tapered as indicated at 21b, to provide for the initial engagement of the top panel of the cap with the hold-down plate. Such engagement results in an upward displacement of the hold-down plate 21, which is resiliently opposed with a substantially constant force by exerted through the linkage 30 by the compression spring 60. As the cap C is concurrently rotated by the frictional engagement of its side-walls with the friction rail 26, it will tend to move downwardly on the threads of the bottle neck. The cap hold-down plate 21, by virtue of the linkage 30, follows such movement, always maintaining its bottom surface 21a exactly horizontal, and always exerting a modest downward pressure on the top panel of the engaged cap.

With this arrangement, a pre-tightening of the cap on the order of one-half to a full turn of the threads may be conveniently accomplished. This amount of pre-tightening is more than adequate to compensate for the lack of sufficient rotary movement of the applicating heads of the applicating machine to which the pre-tightener of this invention is applied. Thus, even though the applicating machine was originally designed to produce only a 720° rotation of the cap relative to the bottle neck, a significant additional rotation of the cap, more than enough to assure the tightening of the cap on the bottle neck may be achieved by the addition of the pre-tightener mechanism of this invention to such applicating machine. Thus, the utility of roll-on cap applicating machines, which exist in large numbers in bottling plants across the country, is preserved, and such machines may be efficiently utilized to apply an entirely different cap than they were originally designed for.

Modifications of this invention will be readily apparent to those skilled in the art and it is intended that the scope of the invention be determined solely by the appended claims.

I claim:

1. In a capping machine for applying threaded caps to threaded bottle necks including bottle transfer means for moving the bottles successively in an upright position into the machine and means for depositing a cap in loose engagement on each bottle neck, the improvement comprising a cap hold-down plate mounted in overlying relation to the path of the bottles in said bottle transfer means and engagable with the top surface of each loosely positioned cap to exert a downward force thereon, means adjacent the said bottle path for relatively rotating the bottle and the respective cap in a direction to threadably engage the cap with the bottle while said hold-down plate is engaged with the cap, and spring pressed linkage means for concurrently exerting a downward force on said hold-down plate as the engaged cap moves downwardly on the respective bottle and maintaining said plate horizontal, said linkage means comprising:

(1) a stationary support plate overlying said bottle path;

(2) a pair of upstanding pivot brackets mounted on said support plate in transversely spaced relation to said bottle path;

(3) a generally horizontal first pivot pin supported by said pair of brackets;

(4) a second upstanding bracket on said support plate in longitudinally spaced relation to said pair of pivot brackets;

(5) a second horizontal pivot pin supported by said second bracket;

(6) said support plate having an elongated slot therein lying intermediate said pair of pivot brackets;

(7) an upstanding L-shaped element rigidly secured at its base to said hold-down plate and projecting upwardly through said elongated slot, the top portion of said element having a vertical slot traversed by said first pivot pin, whereby said hold-down plate is vertically shiftable relative to said support plate;

(8) a pair of first links respectively pivotally mounted at one end on said first pivot pin on each side of said mounting element;

(9) a pair of second links respectively pivotally secured at one end to the other ends of said first links and at their other ends to a third pivot pin traversing the base portion of the L-shaped mounting element;

(10) a fourth horizontal pivot pin traversing the medial portions of said [fourth] *first* links,

(11) a bifurcated spring seat mounted on said third pivot pin;

(12) a bifurcated spring seat mounted on said fourth pivot pin;

(13) a compression spring operating between said bifurcated spring seats to urge said cap hold-down plate downwardly relative to the support plate;

(14) and a generally triangular link having one vertex pivoted to said fourth pin, a second vertex pivoted to the top end of the mounting element and the third vertex pivoted to one end of a third link, the other end of said third link being pivoted to said second pivot pin, whereby said hold-down plate moves vertically with an engaged cap but maintains constant downward force on such cap and a horizontal position of the cap panel.

* * * * *